United States Patent
Hong et al.

(10) Patent No.: US 10,441,053 B2
(45) Date of Patent: Oct. 15, 2019

(54) COSMETIC CONTAINER COMPRISING REFILL CONTAINER HAVING SEALING RING

(71) Applicant: AMOREPACIFIC CORPORATION, Seoul (KR)

(72) Inventors: Sung Soo Hong, Seoul (KR); Ju Ho Kim, Seoul (KR); You Seung Kim, Seoul (KR)

(73) Assignee: AMOREPACIFIC CORPORATION, Seoul (KR)

( * ) Notice: Subject to any disclaimer, the term of this patent is extended or adjusted under 35 U.S.C. 154(b) by 167 days.

(21) Appl. No.: 15/546,954

(22) PCT Filed: Feb. 3, 2016

(86) PCT No.: PCT/KR2016/001189
§ 371 (c)(1),
(2) Date: Jul. 27, 2017

(87) PCT Pub. No.: WO2016/133302
PCT Pub. Date: Aug. 25, 2016

(65) Prior Publication Data
US 2018/0271255 A1    Sep. 27, 2018

(30) Foreign Application Priority Data
Feb. 16, 2015   (KR) .................. 10-2015-0023337

(51) Int. Cl.
*A45D 40/22* (2006.01)
*B65D 77/04* (2006.01)
(Continued)

(52) U.S. Cl.
CPC ........... *A45D 40/22* (2013.01); *A45D 33/003* (2013.01); *A45D 33/006* (2013.01); *A45D 34/00* (2013.01);
(Continued)

(58) Field of Classification Search
CPC .... A45D 40/22; A45D 33/003; A45D 33/006; A45D 40/18; A45D 33/04; A45D 33/00;
(Continued)

(56) References Cited

U.S. PATENT DOCUMENTS 9,936,791 B2 *   4/2018   Kim .................... A45D 33/008

FOREIGN PATENT DOCUMENTS

KR    10-2006-0116141 A    11/2006
KR         10-1355364 B1    1/2014
(Continued)

*Primary Examiner* — Anthony D Stashick
*Assistant Examiner* — L E Kmet
(74) *Attorney, Agent, or Firm* — Heedong Chae; Lucem, PC

(57) ABSTRACT

The present invention relates to a cosmetic container comprising a refill container having a sealing ring and, more specifically, to a cosmetic container comprising a refill container having a sealing ring, the cosmetic container having a refill container holder embedded in an outer case, and having the refill container, which contains cosmetics, used by being coupled to the refill container holder, and improving refill convenience since after the cosmetics are completely used, a user easily separates the refill container from the refill container holder by pressing the refill container on the top thereof, and then can couple a new refill container to the refill container holder from the bottom of the outer case, thereby easily replacing the refill container.

13 Claims, 8 Drawing Sheets

(51) Int. Cl.
  *F16J 15/02*    (2006.01)
  *A45D 33/00*    (2006.01)
  *F16J 15/32*    (2016.01)
  *A45D 34/00*    (2006.01)
  *B65D 53/02*    (2006.01)
  *A45D 40/18*    (2006.01)
(52) U.S. Cl.
  CPC .............. *A45D 40/18* (2013.01); *B65D 53/02* (2013.01); *B65D 77/04* (2013.01); *F16J 15/02* (2013.01); *F16J 15/32* (2013.01); *A45D 2200/05* (2013.01); *A45D 2200/051* (2013.01)
(58) Field of Classification Search
  CPC ...... A45D 40/24; A45D 33/008; B65D 53/02; B65D 7/04; B65D 21/00; A45C 11/008; A45C 5/005
  See application file for complete search history.

(56)           References Cited

FOREIGN PATENT DOCUMENTS

| KR | 20-0473573   Y1 | 7/2014  |
| KR | 10-1466854   B1 | 11/2014 |
| KR | 10-2015-0008798 A | 1/2015 |
| KR | 10-1584512   B1 | 1/2016  |

\* cited by examiner

COSMETIC CONTAINER COMPRISING REFILL CONTAINER HAVING SEALING RING

CROSS-REFERENCE TO RELATED APPLICATION

This application claims the benefit of Korean application No. 10-2015-23337, filed on Feb. 16, 2015 with the Korean Intellectual Property Office, the disclosure of which is incorporated herein by reference.

TECHNICAL FIELD

The present invention relates to a cosmetic container with a refill container having a sealing ring, and more particularly, to a cosmetic container with a refill container having a sealing ring, where the refill container containing cosmetics is coupled to a refill container holder embedded in an outer container and, after the cosmetics are used up and a user easily separates the refill container separated from the refill container holder by pressing the refill container from an upper portion the refill container, a new refill container is coupled to the refill container holder, such that the refill container may be easily exchanged, thereby improving the convenience of exchanging the refill container. In addition, a fixing member is formed on an inner upper portion of the refill container holder to be integrated with the refill container holder, so that the number of components is reduced, so the processes of assembling the components are reduced so that the component price is reduced and the productivity is improved. In addition, to solve the problem that the refill container is required to have a constant thickness due to the weak strength of synthetic resin so that the cosmetic containing space is smaller, the refill container is formed of a metallic material to have a thin thickness such that the cosmetic containing space is maximized. Furthermore, an upper part of the refill container is coupled to a sealing ring having an "inverse U" shaped sectional surface and made of a metallic material, so that cosmetics are prevented from being leaked due to the insufficient sealing of the refill container made of a metal material when the refill container made of a metal material is coupled to the refill container holder made of synthetic resin.

BACKGROUND ART

Color cosmetics, which are used to beautifully adorn the skin of a user by making the appearance beautiful, are classified into a base makeup used for making a skin color uniform and covering a defect and a point makeup used for partially enhancing a three-dimensional effect of a lip, eyes, or nails. The base makeup includes a makeup base, a foundation and a powder, and the point makeup includes a lipstick, an eye liner, and mascara.

The foundation is classified into solid-type foundation, liquid-type foundation and gel-type foundation according to a type of cosmetic contents. In case of the solid-type foundation, although the solid-type foundation has a good cover effect, the makeup is united when the makeup is refreshed. In case of the liquid-type foundation, although the liquid-type foundation gives a good close contact feel, the persistency is weak. Thus, in recent years, the number of customers favoring the gel-type foundation having a considerable persistency and a good close contact feel has been increased.

Therefore, there is need to develop a container for gel-type foundation. Generally, the gel-type foundation, which is filled into a glass container or a tub-type container, is used in such a manner that a user takes some foundation on his hands for use or squeezes foundation from the container and then, coats the foundation on his skin by using a puff or his hands.

However, according to the related art, since a user gets cosmetics on his hands every time that it is used, it is inconvenient to wash hands every time after use. In addition, as the hands coated with cosmetics are washed, the cosmetics are wasted.

To solve the above problems, as shown in FIG. 1, a compact container having an impregnation member 1 which is impregnated with cosmetics and embedded in an inner container is disclosed in Korean Registered Patent No. 10-1257628 issued to the applicant of the present application. According to the related art, a user uses the cosmetics impregnated to the mixing member by getting a puff the cosmetics to coat the cosmetics on his skin, so that the user can wear makeup without coating user's hands with the cosmetics.

However, since cosmetics impregnated to the impregnation member 1 contain a large quantity of volatile materials, when the sealing of the inner container containing the cosmetics is deteriorated, the volatile materials are volatilized into the atmosphere, so that the cosmetics are hardened, thereby losing the inherent function. Thus, there is a need to a method of preventing the volatile materials of cosmetics from being volatilized.

To solve the above-described problems, as shown in FIG. 2, an airtight cosmetic container is disclosed in Korean Registered Patent No. 10-1297824, where a sealing rib 3 is formed on a lower portion of a packing case lid such that the sealing rib 3 is inserted into a packing groove formed in a packing case 2, so that the packing case 2 is effectively sealed, thereby preventing the volatile materials of cosmetics from being volatilized.

However, according to the related art, to refill the cosmetics, after the packing case 2 is separated from an outer container, the packing case lid is opened to separate a fixing member 4. Then, after an inner container 5 is changed for a new inner container 5, the inner container 5 must be assembled in a reverse sequence again. Thus, since several components must be separated and assembled again to exchange the inner container 5, the refill process is inconvenient.

In addition, according to the related art, since the fixing member 4 for fixing the impregnation member is separately formed while covering an upper part of the inner container 5, the number of assembling components is increased so that the manpower for assembly is increased, thereby deteriorating the productivity and increasing the component prices.

In addition, according to the related art, when the inner container 5 is made of synthetic resin, the inner container 5 made of synthetic resin is required to have a constant thickness or above, so that the cosmetic containing space is reduced, so it is limited to maximize the amount of cosmetics filled in the inner container 5.

DISCLOSURE

Technical Problem

In order to solve the above problem, according to the present invention, a refill container holder is equipped in an outer container, and a refill container for accommodating a cosmetic material is coupled to the refill container holder for use. An object of the present invention is to provide a cosmetic container with a refill container having a sealing ring, in which, after using the cosmetic material, the user presses the refill container from the top thereof to easily separate the refill container from the refill container holder, and a new refill container is coupled to the refill container holder from a lower portion of the outer container, so that the refill container is easily replaced, thereby improving the convenience upon refilling.

In addition, an object of the present invention is to provide a cosmetic container with a refill container having a sealing ring, in which a fixture is integrated with the refill container holder on an upper inside of the refill container holder, so that the number of components is reduced and a component assembly process is reduced, thereby reducing component costs and improving productivity.

In addition, an object of the present invention is to provide a cosmetic container with a refill container having a sealing ring, in which the refill container is formed of a metal to have a thin thickness, so that a cosmetic material accommodation space inside the refill container is maximized.

In addition, an object of the present invention is to provide a cosmetic container with a refill container having a sealing ring, in which the sealing ring having a sectional surface formed in an inverted U shape is coupled to an upper portion of the refill container formed of the metal to prevent leakage of the cosmetic material caused by bad sealing due to the nature of the metal material when the refill container formed of the metal material is coupled to the refill container holder formed of synthetic resin.

In addition, an object of the present invention is to provide a cosmetic container with a refill container having a sealing ring, in which sealing protrusion wheels are formed to be offset on inner side walls facing each other inside the sealing ring, so that the cosmetic material filled in the refill container is effectively prevented from being leaked.

Technical Solution

The present invention provides a cosmetic container with a refill container having a sealing ring, which includes:
an outer container (10) provided with a refill container receiving groove (13);
an outer container lid (20) coupled to the outer container (10);
a refill container holder (30) installed inside the outer container (10);
a refill container holder lid (40) coupled to an upper part of the refill container holder (30); and
a refill container (50) coupled to an inside of the refill container holder (30) and formed therein with a cosmetic containing space (51),
wherein the refill container (50) is formed of a metal material having a thin thickness, and
a sealing ring (60) is coupled to an upper end of the refill container (50) to prevent cosmetics contained in the refill container (50) from being leaked.

A fixing member (36) extends inward from an upper end of the refill container holder (30) and is bent downward to form a separating space (370) at an inside of the refill container holder (30).

A first coupling protrusion protrudes from an inner periphery surface of the refill container holder (30), and the first coupling protrusion (32) is coupled to a second protrusion (52) from on an outer periphery surface of the refill container (50).

Preferably, the refill container (50) is formed of at least one of stainless steel, Fe, Al, Cu, W, Ni, Sn, Mg, Ca, Ti, Zn and Ga.

The cosmetic container further includes an impregnation member (70) installed into the refill container (50).

The sealing ring (60) is interposed between the separating space (37) of the refill container holder (30) and the upper end of the refill container (50).

The sealing ring (60) has an inverse U shaped sectional surface such that a sealing between the refill container holder (30) and the refill container (50) is enhanced Sealing protrusion wheels (61) are formed on inner side walls of the sealing ring (60), which face each other, wherein the sealing protrusion wheels (61) are offset from each other in the inner side walls of the sealing ring (60).

Preferably, the sealing ring (60) is formed of one of polyethylene, natural rubber, urethane rubber, nitrile-butadiene rubber and silicon.

Advantageous Effects

According to the cosmetic container with a refill container having a sealing ring of the present invention, the refill container is coupled to a refill container holder embedded in the outer container. In addition, after the cosmetics are used up and a user easily separates the refill container from the refill container holder by pressing the refill container from an upper portion the refill container, a new refill container is coupled to the refill container holder, such that the refill container may be easily exchanged, thereby improving the convenience of exchanging the refill container.

In addition, according to the cosmetic container with a refill container having a sealing ring of the present invention, the number of components may be reduced by forming a fixing member on an inner upper portion of the refill container holder to be integrated with the refill container holder, so that the component prices may be reduced and the productivity may be improved.

In addition, according to the cosmetic container with a refill container having a sealing ring of the present invention, the refill container is formed of a metal material to have a thin thickness, so that the cosmetic containing space of the refill container may be maximized.

In addition, according to the cosmetic container with a refill container having a sealing ring of the present invention, the upper part of the refill container is coupled to a sealing ring having an 'inverse U' shaped sectional surface and made of a metallic material, so that cosmetics are prevented from being leaked due to the insufficient sealing of the refill container made of a metal material when the refill container made of a metal material is coupled to the refill container holder made of synthetic resin.

In addition, according to the cosmetic container with a refill container having a sealing ring of the present invention, the sealing protrusion wheels are formed on inner side walls of the sealing ring, which face each other, such that the sealing protrusion wheels are offset from each other, so that the cosmetics filled in the refill container are effectively prevented from being leaked.

BEST MODE

Mode for Invention

A cosmetic container with a refill container having a sealing ring according to an embodiment of the present invention will be described with reference to accompanying drawings as follows.

Figure 1:
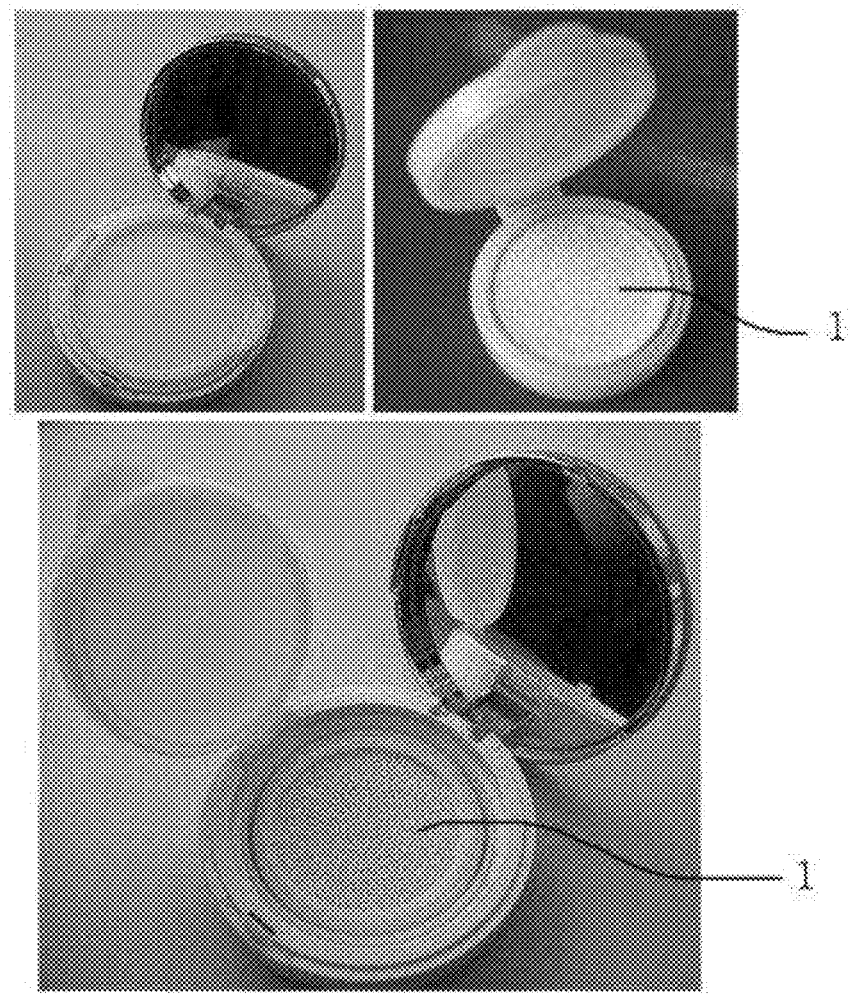
FIG. 1 is a perspective view showing a state that a lid of a compact container according to the related art is opened.
Figure 2:
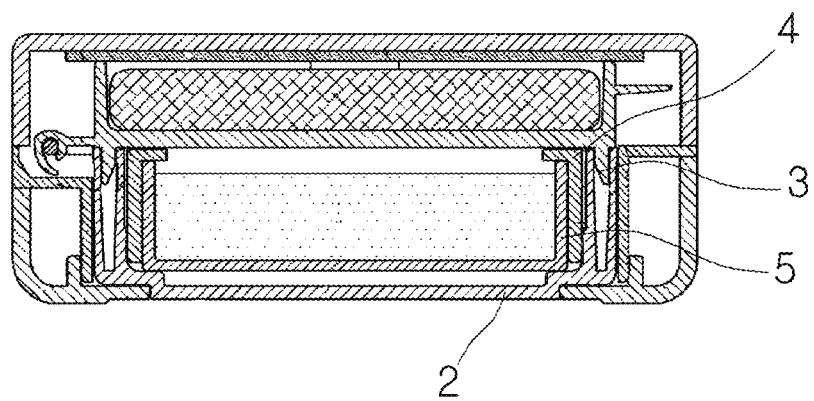
FIG. 2 is a sectional view of another compact container according to the related art.
Figure 3:
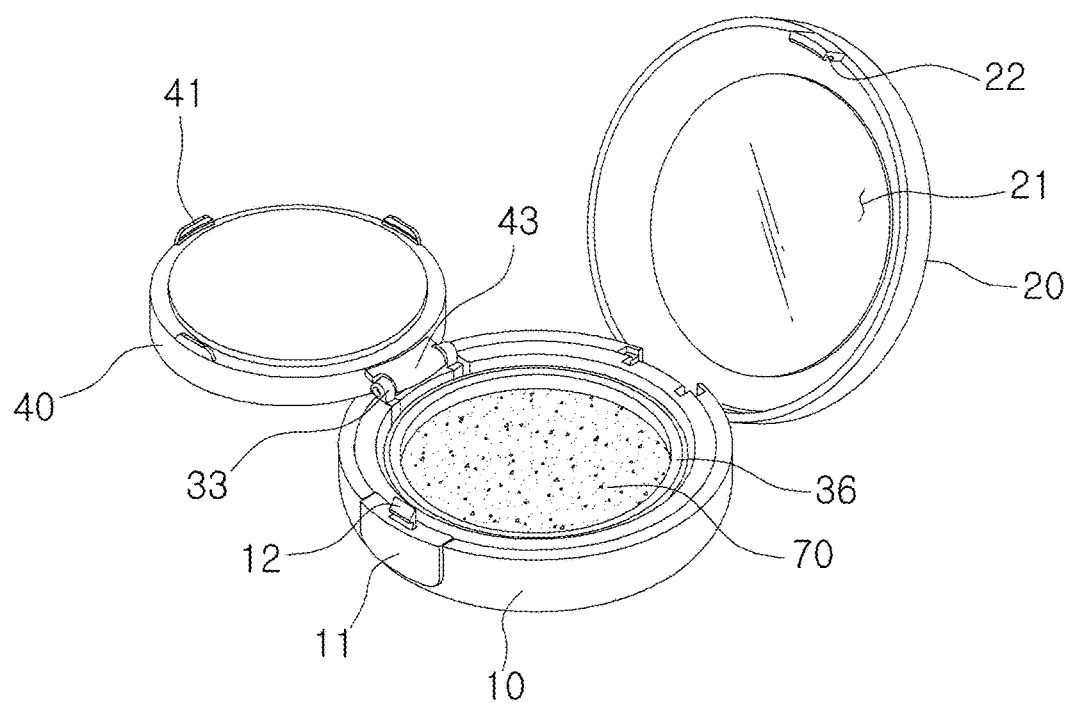
FIG. 3 is a perspective view showing a state that a lid is opened in a cosmetic container with a refill container having a sealing ring according to an embodiment of the present invention.
Figure 4:
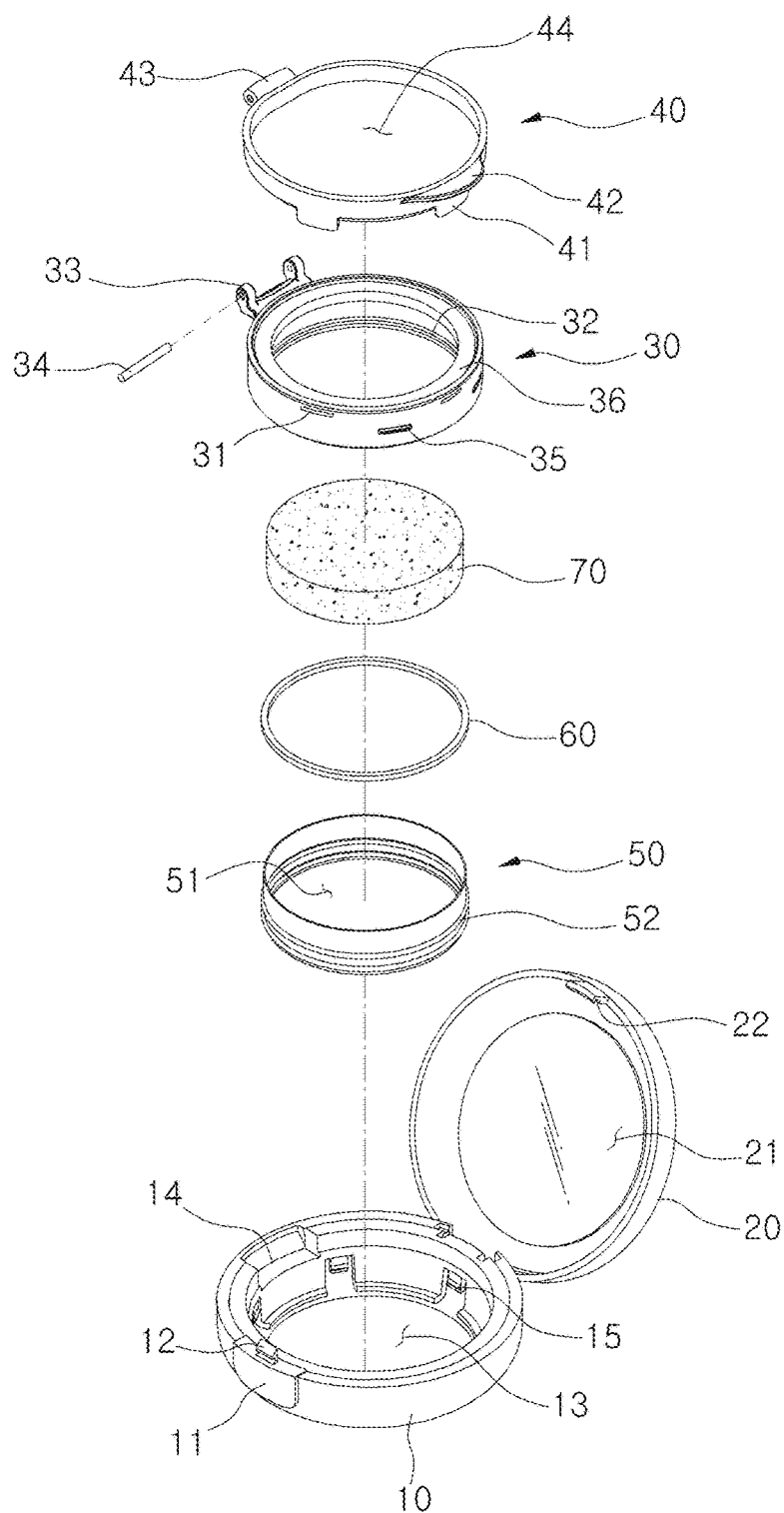
FIG. 4 is an exploded perspective view illustrating a cosmetic container with a refill container having a sealing ring according to an embodiment of the present invention.
Figure 6:
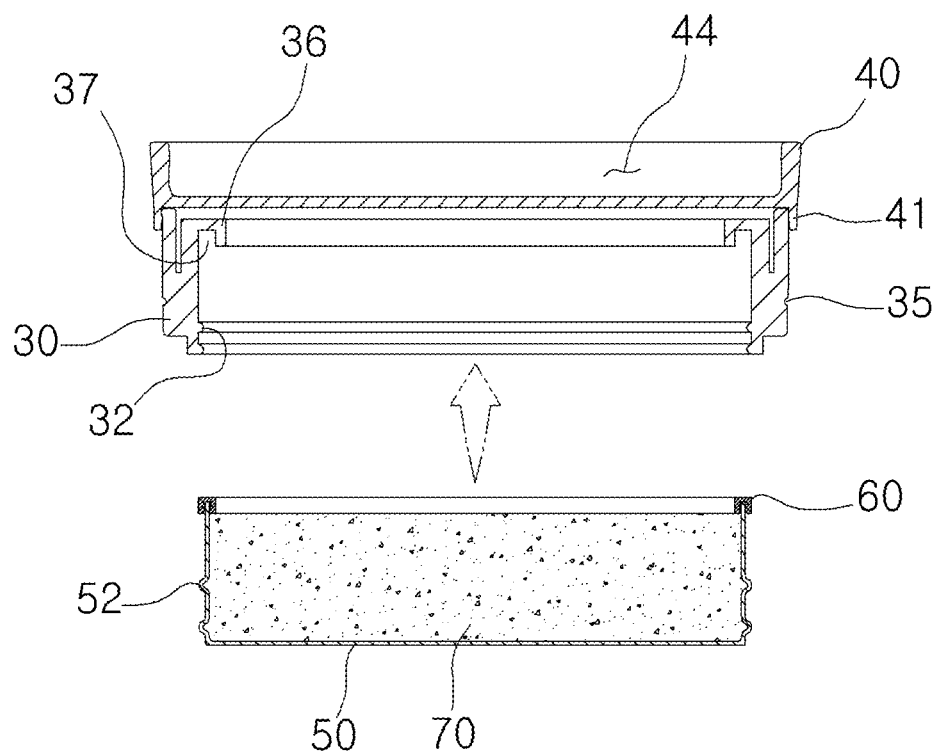
FIG. 6 is a sectional view illustrating a state that a refill container is being coupled to a refill container holder in a cosmetic container with the refill container having a sealing ring according to an embodiment of the present invention.
Figure 7:
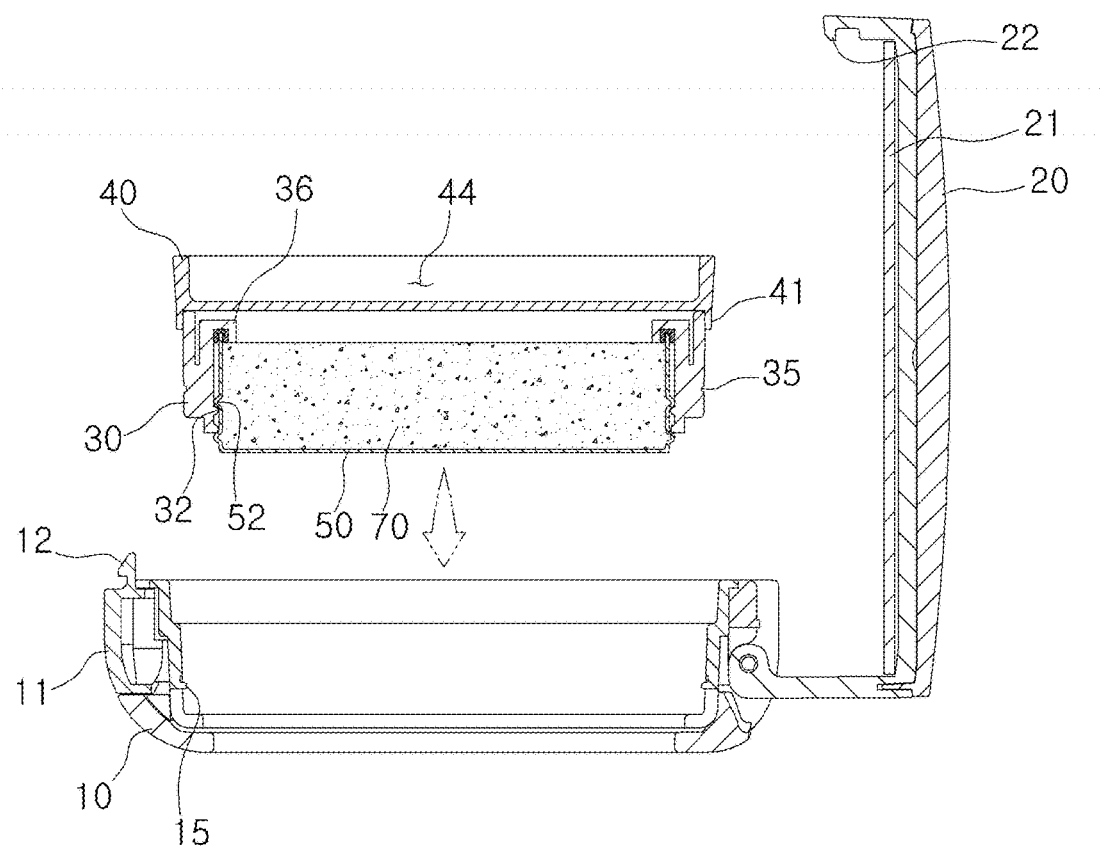
FIG. 7 is a sectional view illustrating a process of coupling a refill container and a refill container holder, which are coupled to each other, to an outer container in a cosmetic container with the refill container having a sealing ring according to an embodiment of the present invention.
Figure 8:
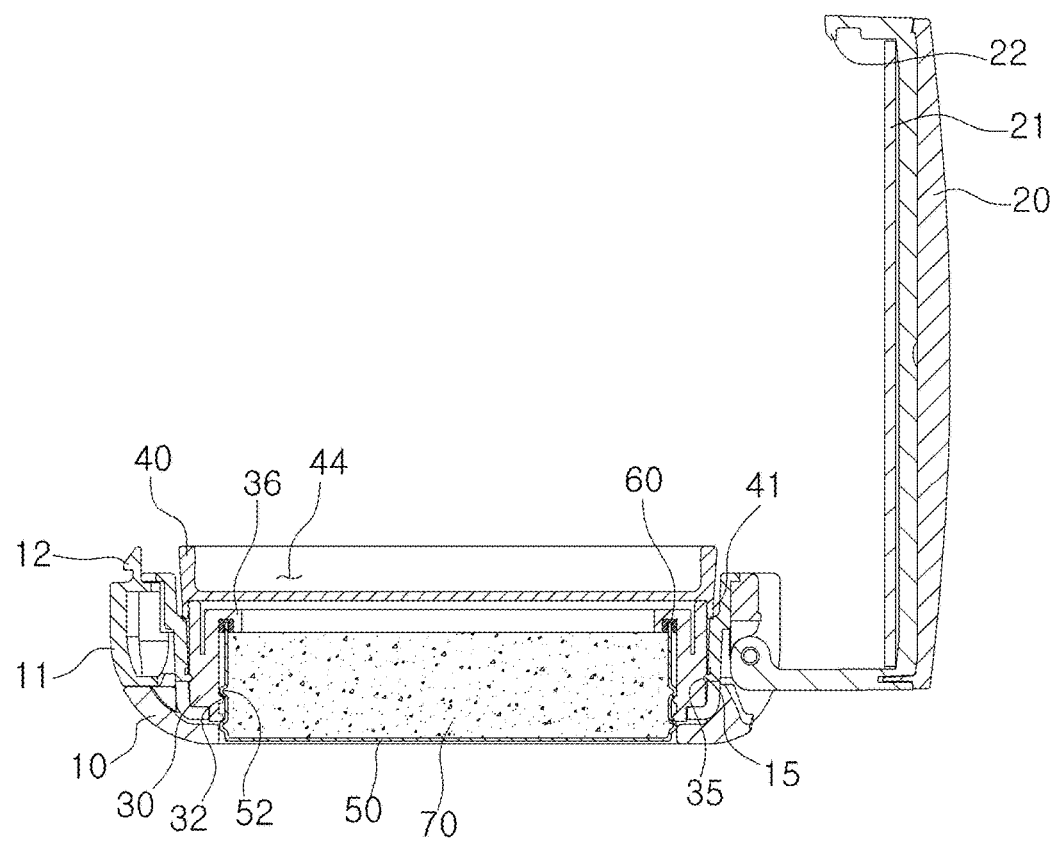
FIG. 8 is a sectional view illustrating a state that a refill container and a refill container holder, which are coupled to each other, are being coupled to an outer container in a cosmetic container with a refill container having a sealing ring according to an embodiment of the present invention.

FIG. 3 is a perspective view showing a state that a lid is opened in a cosmetic container with a refill container having a sealing ring according to an embodiment of the present invention. FIG. 4 is an exploded perspective view illustrating a cosmetic container with a refill container having a sealing ring according to an embodiment of the present invention. FIG. is a sectional view illustrating a cosmetic container with a refill container having a sealing ring according to an embodiment of the present invention. FIG. 6 is a sectional view illustrating a state that a refill container is being coupled to a refill container holder in a cosmetic container with the refill container having a sealing ring according to an embodiment of the present invention. FIG. 7 is a sectional view illustrating a process of coupling a refill container and a refill container holder, which are coupled to each other, to an outer container in a cosmetic container with a refill container having a sealing ring according to an embodiment of the present invention. FIG. 8 is a sectional view illustrating a state that a refill container and a refill container holder, which are coupled to each other, is coupled to an outer container in a cosmetic container with a refill container having a sealing ring according to an embodiment of the present invention.

A cosmetic container with a refill container having a sealing ring according to the present invention includes; an outer container 10 provided with a refill container receiving groove 13; an outer container lid 20 coupled to the outer container 10; a refill container holder 30 installed inside the outer container 10; a refill container holder lid (40) coupled to an upper part of the refill container holder 30; and a refill container 50 coupled to an inside of the refill container holder 30 and formed therein with a cosmetic containing space 51, wherein the refill container 50 is formed of a metal material having a thin thickness, and a sealing ring (60) is coupled to an upper end of the refill container (50) to prevent cosmetics contained in the refill container (50) from being leaked.

The outer container 10 includes a push button 11 provided on one side surface thereof with a locking member 12, and a hinge formed at opposite side to the push button 11, such that the outer container 10 is hinge coupled to the outer container lid 20. The outer container 10 is provided therein with the refill container receiving groove 13 and provided on the side surface thereof with a hinge bracket installing groove 14 and a coupling protrusion 15.

When a user pushes the pushing button 11, the locking member 12 extending from the upper part of the push button 11 easily moves back, such that the push button 11 may be released from a locking protrusion 22.

The refill container 50, which is coupled to the refill container holder 30 and the refill container holder 30, is placed in the refill container receiving groove 13 and the refill container holder 30 is coupled to the coupling protrusion 15 of the outer container 10.

A hinge bracket 33 of the refill container holder 30 is installed into the hinge bracket installing groove 14.

The outer container lid 20 covering the outer container 10 is hinge coupled to the outer container 10 to is opened or closed on the outer container 10.

A mirror 21 may be provided inside the outer container lid to enable a user to easily wear makeup with cosmetics.

The locking protrusion 22 is formed at one side of the outer container lid 20 in a protrusion shape corresponding to the locking member 12 of the outer container 10.

A coupling groove 31 is formed on an outer periphery surface of an upper end of the refill container holder 30. A first coupling protrusion 32 is formed on an inner periphery surface of the refill container holder 30 and a coupling groove is formed below the coupling groove 31.

In addition, the hinge bracket 33 and a hinge pin 34 are formed on the refill container holder 30 such that the refill container holder 30 is coupled to the refill container holder lid 40, and a fixing member 36 is formed at an upper inner side of the refill container holder 30.

The coupling groove 31 is formed on an upper end of the outer periphery surface of the refill container holder 30 and is engaged with the refill container holder lid 40 to enhance the sealing of the refill container 50.

The first coupling protrusion 32 is coupled to a second coupling protrusion 52 formed on the outer periphery surface of the refill container 50 to fixedly couple the refill container 50 to the refill container holder 30.

The hinge bracket 33 is formed on the side surface of the refill container holder 30 such that the hinge bracket 33 is hinge coupled to the refill container holder lid 40 through the hinge pin 34.

The coupling groove 35 is formed on the lower end of the outer periphery surface of the refill container holder 30 and the coupling protrusion 15 is fitted into the coupling groove so that the refill container holder 30 is fixedly coupled to the outer container 10.

The fixing member 36 extends inward from an upper end of the refill container holder 30 and bent downward to push an edge of an impregnation member 70 contained in the refill container 50 so that the impregnation member 70 is prevented from moving. In addition, as shown in FIG. 7, the refill container 50 coupled to the sealing ring 60 is fitted into separating space 37.

The fixing member 36 may be formed integrally with or separately from the refill container holder 30.

The coupling protrusion 41 is formed on a lower end of the refill container holder lid 40 and is coupled to the coupling groove 31 of the refill container holder 30, so that the sealing of the refill container 30 is enhanced.

An opening/closing handle 42 is formed on one side surface of the refill container holder lid 40 to easily open or close the refill container holder lid 40.

A hinge protrusion 43 is formed at one side of the refill container holder lid 40 and is fitted with the hinge bracket 33 of the refill container holder 30 so that the refill container holder lid 40 is fixed by the hinge pin 34.

In addition, a puff containing groove 44 for keeping a puff (not shown) as a makeup tool is formed on an upper surface of the refill container holder lid 40.

The refill container 50 is coupled to an inside of the refill container holder 30 from the bottom of the refill container holder 30.

As in the related art, if the refill container 50 is made of synthetic resin, since the refill container 50 is formed to have a constant thickness or more due to the weak strength of synthetic resin, the cosmetic containing space 51 becomes smaller.

Unlike the related art, the refill container 50 according to the present invention is made of a metal material, so that the refill container 50 may be formed to have a thin thickness, thereby maximizing the cosmetic containing space 51.

Preferably, the refill container 50 is formed of at least one of stainless steel, Fe, Al, Cu, W, Ni, Sn, Mg, Ca, Ti, Zn and Ga.

The refill container 50 is provided with a cosmetic containing space 51 and a second coupling protrusion 52 is formed on the outer periphery surface of the refill container 50.

Cosmetics are directly contained in the cosmetic containing space 51 or the impregnation member 70 which is impregnated with cosmetics is installed into the cosmetic containing space 51. The impregnation member 70 installed into the cosmetic containing space 51 will be described in this embodiment.

The impregnation member 70 may be formed of at least one selected from the group consisting of butadiene rubber (BR), styrene butadiene rubber (SBR), natural rubber (NR), acrylonitrile-butadiene rubber (NBR), wet urethane, dry urethane, polyether, polyvinyl chloride, polyethylene, latex, silicon, polyvinyl alcohol (PVA), nitrile rubber, butyl-rubber and neoprene.

The second coupling protrusion 52 is coupled to the first coupling protrusion 32 formed on the inner periphery surface of the refill container holder 30 such that the refill container 50 is coupled to the refill container holder 30.

Although the refill container 50 is fittingly coupled to the refill container holder 30, the refill container 50 may be coupled to the refill container holder 30 through an under-cut coupling scheme or a screw coupling scheme.

Since the refill container 50 is exchangeable, the outer container 10 and the refill container holder 30 may be reused by exchanging only the refill container 50 containing the impregnation member 70 without exchanging the whole cosmetic container.

Since the refill container 50 is formed of a metal material and the refill container holder 30 is formed of synthetic resin, when the refill container 50 is coupled to the refill container holder 30, the sealing ring 60 is coupled between the upper end of the refill container 50 and the separating space 37 of the refill container holder 30 to enhance the sealing.

The sealing ring 60 has an 'inverse U'-shaped end surface in order to enhance the sealing between the refill container holder 30 and the refill container 50.

Figure 5:
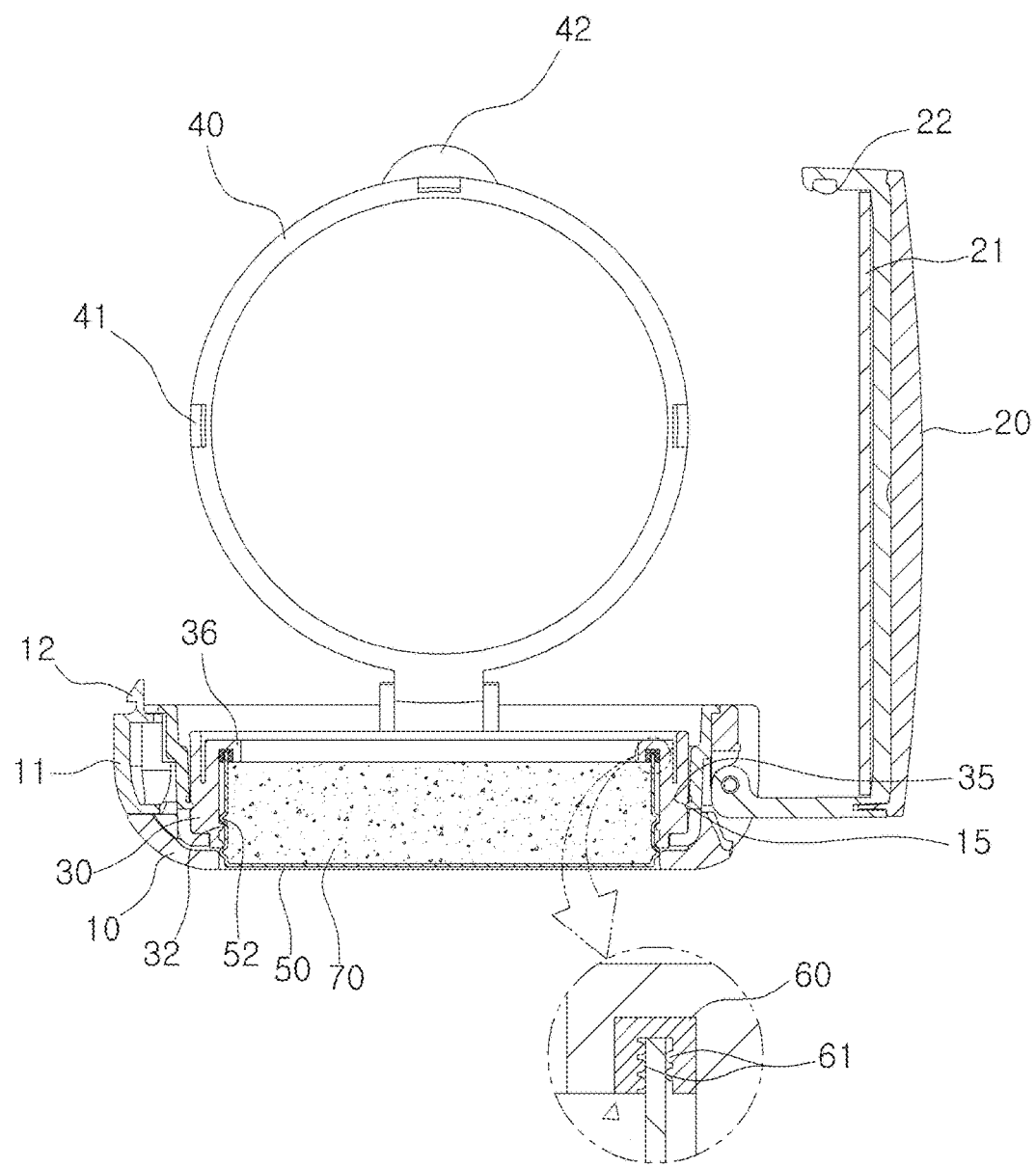
FIG. 5 is a sectional view illustrating a cosmetic container with a refill container having a sealing ring according to an embodiment of the present invention.

As shown in a partially enlarged view of FIG. 5, sealing protrusion wheels 61 are formed on inner side walls of the sealing ring 60, which face each other, such that the sealing protrusion wheels 61 are offset from each other in the inner side walls.

Since the sealing protrusion wheels 61 are offset from each other, as shown in FIG. 5, the side surface of the refill container 50 is offset-pressed so that the sealing performance is enhanced.

Preferably, the sealing ring 60 is formed of at least one of polyethylene (PE), natural rubber, urethane rubber, nitrile-butadiene rubber (NBR) and silicon.

Hereinafter, a method of assembling a cosmetic container with a refill container having a sealing ring according to an embodiment and a state of using it will be described in detail as follows.

According to the prevent invention, after the outer container lid 20 is coupled to the outer container 10 in which the refill container receiving groove 13, the refill container holder lid 40 is coupled to the refill container holder 30.

Then, the impregnation member 70 which is impregnated with cosmetics is installed into the refill container 50 and as shown in FIG. 6, the refill container 50 is coupled to the refill container holder 30 while the sealing ring 60 is coupled to the upper end of the refill container 50.

In this case, the sealing 60 has an 'inverse U' shaped end surface to enhance the sealing between the refill container holder 30 and the refill container 50 and is coupled to the upper end of the side wall of the refill container 50. The sealing protrusion wheels 61 are formed on the inner side walls of the sealing ring (60), which face each other, and the sealing protrusion wheels 61 are offset from each other in the inner side walls of the sealing ring 60 as shown in FIG. 5.

Thereafter, as shown in FIGS. 7 and 8, the assembly is completed by installing the refill container holder 30 coupled to the refill container 50 into the refill container receiving groove 13.

The impregnation member 70 is pressed by a puff in order to use the contents in the cosmetic container which is provided with the refill container having the sealing ring assembled in the above-described manner.

After all cosmetics of the impregnation member 70 are used up, the refill container 50 is separated from the refill container holder 30 through the bottom of the refill container holder 30 by pressing the impregnation member 70 from the top of the impregnation member 70 in order to refill the refill container 50.

Thereafter, a new refill container 50 is pushed into the refill container holder 30 from the bottom of the refill container holder 30, such that the new refill container 50 is couple to the refill container holder 30.

When the refill container 50 is exchanged according to the above-described manner, the outer container 10 and the refill container holder 30 may be reused without dumping them.

The cosmetic container with a refill container having a sealing ring described in this disclosure is an illustrative purpose only, and the present invention is not limited thereto. Thus, it should be understood that numerous other modifications and embodiments can be devised by those skilled in the art within the spirit and scope of the present invention and they will fall within the scope of the present invention.

DESCRIPTION OF REFERENCE NUMERAL

10: Outer container
11: Push button

12: Locking member
13: Refill container receiving groove
14: Hinge bracket installing groove
15: Coupling protrusion
20: Outer container lid
21: Mirror
22: Locking protrusion
30: Refill container holder
31: Coupling groove
32: First coupling protrusion
33: Hinge bracket
34: Hinge pin
35: Coupling groove
36: Fixing member
37: Separating space
40: Refill container holder lid
41: Coupling protrusion
42: Opening/closing handle
43: Hinge protrusion
44: Puff containing groove
50: Refill container
51: Cosmetic containing space
52: Second coupling protrusion
60: Sealing ring
61: Sealing protrusion wheel
70: Impregnation member

The invention claimed is:

1. A cosmetic container with a refill container having a sealing ring, the cosmetic container comprising:
an outer container (10) formed thereon with a refill container accommodation groove (13);
an outer container lid (20) coupled to the outer container (10);
a refill container holder (30) mounted inside the outer container (10);
a refill container holder lid (40) coupled to an upper portion of the refill container holder (30); and
a refill container (50) coupled to an inner side of the refill container holder (30) and formed therein with a cosmetic material accommodation space (51), wherein
the refill container (50) is formed of a thin metal, a sealing ring (60) is coupled to an upper end of the refill container (50) to prevent leakage of cosmetic materials accommodated in the refill container (50), a fixture (36) inwardly extends from an upper end of the refill container holder (30) and is downwardly bent to form a separation space (37) therein, and the sealing ring (60) is fitted between the separation space (37) of the refill container holder (30) and the upper end of the refill container (50).

2. A cosmetic container with a refill container having a sealing ring, the cosmetic container comprising:
an outer container (10) formed thereon with a refill container accommodation groove (13);
an outer container lid (20) coupled to the outer container (10);
a refill container holder (30) mounted inside the outer container (10);
a refill container holder lid (40) coupled to an upper portion of the refill container holder (30); and
a refill container (50) coupled to an inner side of the refill container holder (30) and formed therein with a cosmetic material accommodation space (51), wherein
the refill container (50) is formed of a thin metal, a sealing ring (60) is coupled to an upper end of the refill container (50) to prevent leakage of cosmetic materials accommodated in the refill container (50), and the sealing ring (60) has a sectional surface formed in an inverted U shape to improve sealing force between the refill container holder (30) and the refill container (50).

3. The cosmetic container of claim 1, wherein a first combining protrusion (32) protrudes from an inner peripheral surface of the refill container holder (30), and the first coupling protrusion (32) is coupled with a second coupling protrusion (52) formed on an outer peripheral surface of the refill container (50).

4. The cosmetic container of claim 1, wherein the refill container (50) is formed of at least one of stainless steel, iron (Fe), aluminum (Al), copper (Cu), tungsten (W), nickel (Ni), tin (Sn), magnesium (Mg), calcium (Ca), titanium (Ti), zinc (Zn), and gallium (Ga).

5. The cosmetic container of claim 1, wherein the refill container (50) is mounted therein with an impregnating member (70).

6. The cosmetic container of claim 1, wherein the sealing ring (60) has a sectional surface formed in an inverted U shape to improve sealing force between the refill container holder (30) and the refill container (50).

7. The cosmetic container of claim 2, wherein sealing protrusion threads (61) are formed on inner side walls facing each other inside the sealing ring (60), and the sealing protrusion threads (61) are offset from each other on the inner side walls of the sealing ring (60).

8. The cosmetic container of claim 1, wherein the sealing ring (60) is formed of at least one of polyethylene (PE), natural rubber, urethane rubber, nitrile-butadiene rubber (NBR), and silicone.

9. The cosmetic container of claim 2, wherein a first combining protrusion (32) protrudes from an inner peripheral surface of the refill container holder (30), and the first coupling protrusion (32) is coupled with a second coupling protrusion (52) formed on an outer peripheral surface of the refill container (50).

10. The cosmetic container of claim 2, wherein the refill container (50) is formed of at least one of stainless steel, iron (Fe), aluminum (Al), copper (Cu), tungsten (W), nickel (Ni), tin (Sn), magnesium (Mg), calcium (Ca), titanium (Ti), zinc (Zn), and gallium (Ga).

11. The cosmetic container of claim 2, wherein the refill container (50) is mounted therein with an impregnating member (70).

12. The cosmetic container of claim 6, wherein sealing protrusion threads (61) are formed on inner side walls facing each other inside the sealing ring (60), and the sealing protrusion threads (61) are offset from each other on the inner side walls of the sealing ring (60).

13. The cosmetic container of claim 2, wherein the sealing ring (60) is formed of at least one of polyethylene (PE), natural rubber, urethane rubber, nitrile-butadiene rubber (NBR), and silicone.

* * * * *